C. R. HOLDEN.
RAILWAY ROAD BED CONSTRUCTION.
APPLICATION FILED JULY 28, 1910.

1,020,096.

Patented Mar. 12, 1912.

Witnesses:

Inventor:
Charles R. Holden,
By Dyrenforth, Lee, Chritton & Wiles,
Attys.

C. R. HOLDEN.
RAILWAY ROAD BED CONSTRUCTION.
APPLICATION FILED JULY 28, 1910.

1,020,096.

Patented Mar. 12, 1912.

Witnesses:

Inventor:
Charles R. Holden
By Dyrenforth, Lee, Chritton & Wiles,
Attys.

C. R. HOLDEN.
RAILWAY ROAD BED CONSTRUCTION.
APPLICATION FILED JULY 28, 1910.

1,020,096.

Patented Mar. 12, 1912.

Witnesses:

Inventor:
Charles R. Holden.
By Dyrenforth, Lee, Chritton & Wiles,
Attys.

UNITED STATES PATENT OFFICE.

CHARLES R. HOLDEN, OF CHICAGO, ILLINOIS.

RAILWAY-ROAD-BED CONSTRUCTION.

1,020,096. Specification of Letters Patent. Patented Mar. 12, 1912.

Application filed July 28, 1910. Serial No. 574,365.

*To all whom it may concern:*

Be it known that I, CHARLES R. HOLDEN, a citizen of the United States, residing at Chicago, in the county of Cook and State of Illinois, have invented a new and useful Improvement in Railway-Road-Bed Construction, of which the following is a specification.

My invention relates to improvements in tie-plates, means for securing them in place on the ties, and means for securing the rails to the plates; my primary objects being to provide improved means for fastening the rails to the plates, and improved means for securing the plates to the ties which shall be readily applicable to the plates and rails for firmly holding these parts of the road-bed in position, shall be simple of construction, economical of manufacture, and permit of adjustment of the rails on the plates.

Other primary objects are to provide a construction of the plate which will present the degree of flexibility desired, without sacrificing strength of structure, and which will not present the disadvantage, common in tie-plates as hitherto constructed, of drawing the spikes to such an extent as to impair the stability of the construction, and to provide for the adjustment of the rails on the plates, when wear of the rails renders adjustment necessary, without involving the repositioning of the plates on the tie.

My invention is illustrated in the accompanying drawings, in which—

Figures 3, 4:
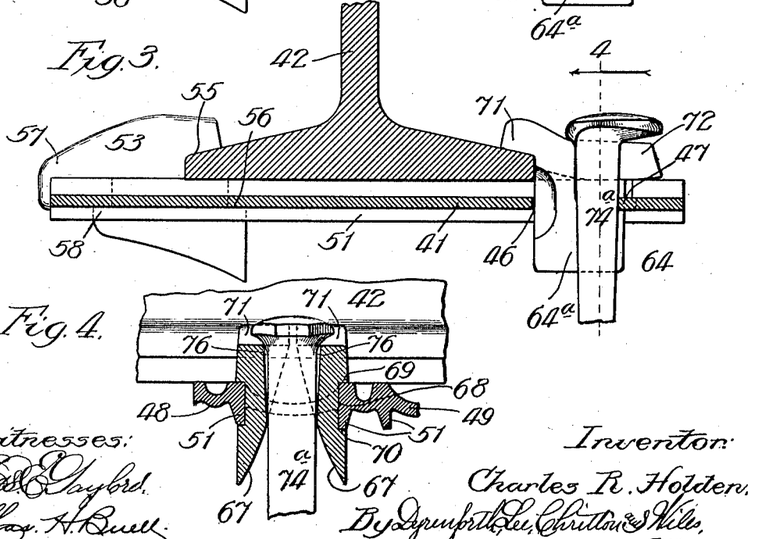
Fig. 3 is a view like that of Fig. 2 showing the clip in final rail-flange-engaging position.
Fig. 4 is a broken section taken at the line 4 on Fig. 3 and viewed in the direction of the arrow, the spike being shown in elevation.
Figure 5:
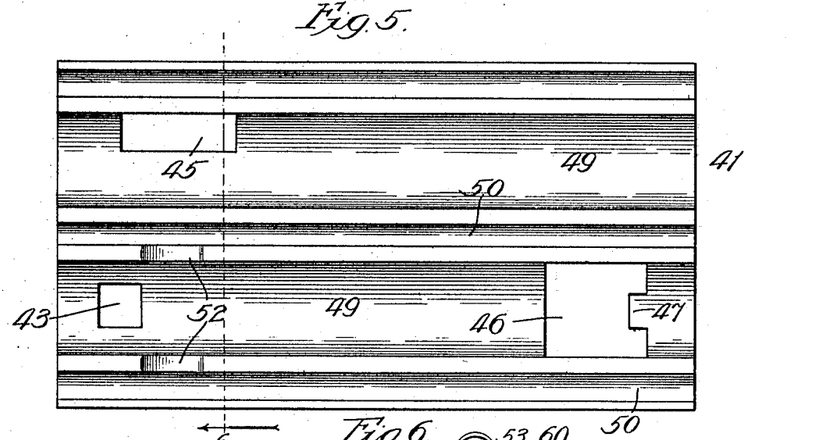
Fig. 5 is a top plan view of the tie-plate construction of Fig. 1, with the separable abutments removed.
Figures 6, 7, 8, 9, 10:
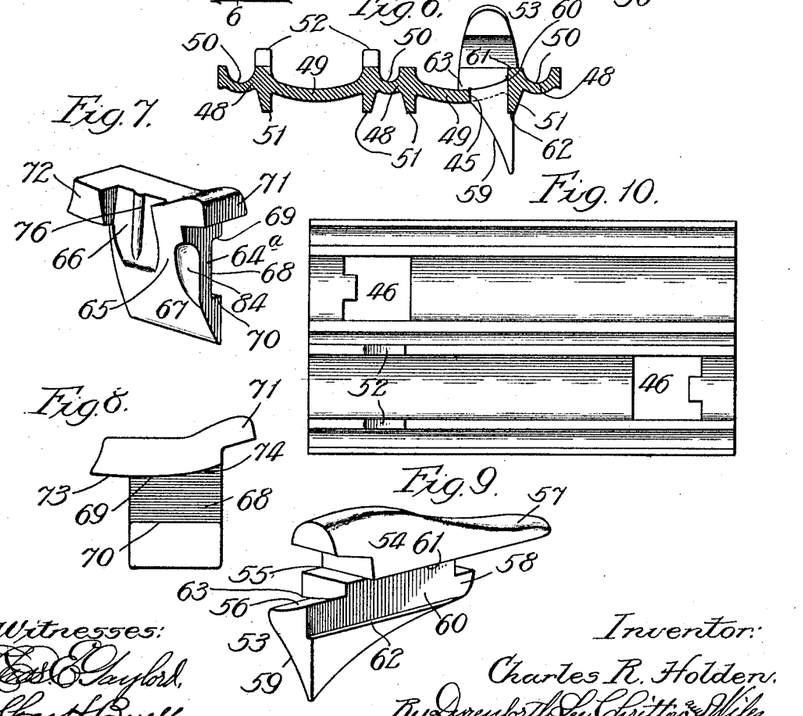
Fig. 6 is a section taken at the line 6 on Fig. 5 and viewed in the direction of the arrow, the removable abutment for the left-hand end of the plate, in Fig. 5, being shown as secured in position on the plate.
Fig. 7 is a perspective view of one of the two similar coöperating members of the rail-flange-engaging clip shown at the right-side of Fig. 3, the clip in this figure being viewed from the inside.
Fig. 8 is a view in side elevation of the clip-member shown in Fig. 7.
Fig. 9 is a perspective view of the rail-flange-engaging abutment shown in the left-hand side of Fig. 3.
Fig. 10 is a plan view of a modification of the plate of the preceding constructions.

Referring to Figs. 1 to 9 inclusive, a tie which may be of wood or any other suitable material capable of receiving spikes and otherwise adapted for use as a tie, is represented at 40. The tie is shown as supporting at its upper side toward its opposite ends plates 41, of metal, which are considerably longer than the width of the rails supported thereon and represented at 42, each of these plates containing in one end-portion beyond the sides of the adjacent rail, a spike-hole 43 through which a spike 44 is driven, and an elongated slot 45, these plates being provided in their inner end-portions beyond the adjacent rails with openings 46 of rectangular shape provided on the walls thereof farthest from the adjacent rails with lips, or shoulders, 47, for a purpose hereinafter explained. Each plate 41 is formed with a plurality of longitudinally-extending parallel bars 48 spaced apart and connected together by webs 49 which are of concavo-convex shape in cross-section as illustrated in Fig. 6 with their concave surfaces uppermost. The bars 48, which are preferably grooved longitudinally as represented at 50, are thicker and heavier than the webs 49, and are provided with longitudinally-extending flanges 51 on their under sides, there being one of such flanges on each of the two outermost bars, with their inner faces vertical, and two such flanges on the intermediate one of the bars 48, whereby the last referred to bar is rendered somewhat more rigid than those flanking it. The flanges 51 adjacent to the spike-holes 43, which latter are formed in one of the webs 49, are provided on their upper surfaces with integral abutments 52 for engaging with the outer flanges of the rail. The lateral walls of the openings 45, which are nearest the edge of the plate, are coincident with the inner edges of the flanges on the bar at the right-hand side of Fig. 6, and the opposite lateral walls of the openings 46 are coincident with the inner surfaces of the flanges 51 between which they are located as represented in Fig. 4.

Figures 1, 2:
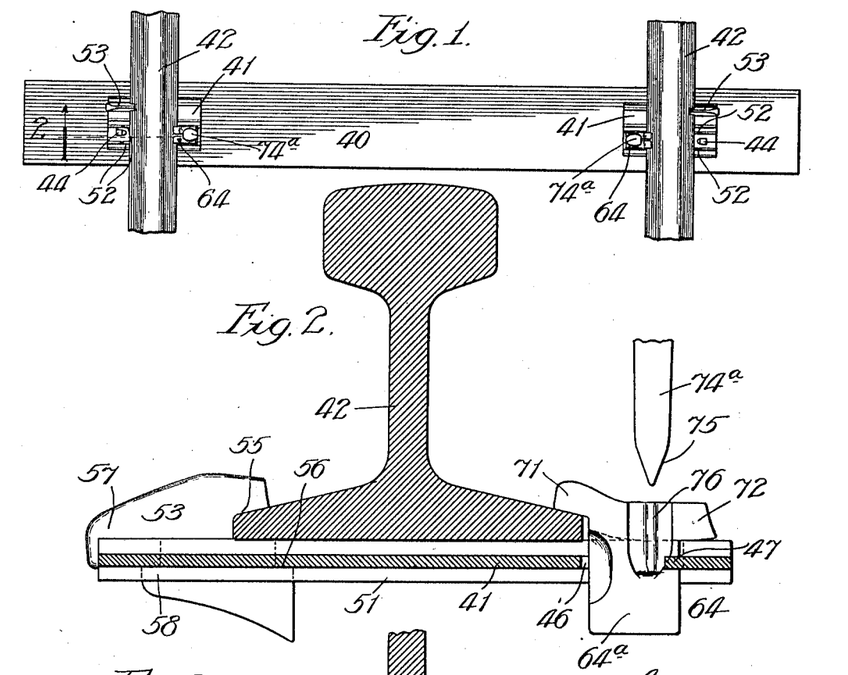
Figure 1 is a plan view of a tie showing a pair of rails secured thereto on plates held to the tie, the whole being constructed in accordance with my invention.
Fig. 2 is an enlarged section taken at the line 2 on Fig. 1 and viewed in the direction of the arrow, the spike for holding the rail-engaging clip to the rail being shown as withdrawn from the plate, and the clip in the position it assumes before being forced into rail-flange-engaging position.

Coöperating with the pair of fixed abutments 52 is a separable abutment 53 formed of a body-portion 54 recessed at one end as indicated at 55 and provided forward of said recess with a shoulder 56 and on the rear end thereof with spaced rearwardly-extending lugs 57 and 58, this abutment, when positioned on the plate 41, extending through the opening 45 and engaging at its lugs 57 and 58 with the upper and lower surfaces, respectively, of the plate 41, and at its shoulder 56 with the under side thereof, as represented in Fig. 2. The lower end of the abutment 53, which is tapered as represented at 59, extends below the plate 41 and penetrates the tie longitudinally thereof when applied thereto, as hereinafter described, the outer face of this abutment being provided with a recess 60 affording upper and lower shoulders 61 and 62 which interlock with the adjacent bar 48 and flange 51, respectively, as represented in Fig. 6, and its inner face being shouldered as represented at 63 to be seated against the upper surface of the web 39, through which the abutment extends. The separable abutment 53 which is thus caused to firmly interlock with the plate 41, and the fixed abutments 52, thus affords means on the plate for engaging with the outer flange of the rail to prevent spreading thereof.

The rail is held in position at its inner flange by a clip-device 64 formed of two companion members 64ᵃ each of which comprises a body-portion 65 containing a vertical recess 66 in one face, the inner wall of which recess is approximately parallel with the outer face of the member 64ᵃ. The inner lower face of each member 64ᵃ is beveled as indicated at 67, and its outer face is recessed at 68 to afford upper and lower shoulders 69 and 70. The forward end of each member 64ᵃ is provided with an upwardly-inclined shoulder, or lip, 71, and its rear end with a lug 72, the under surface of the lug 72 being slightly convexed as represented at 73, and the under surface of the shoulder 69, which merges into the under surface of the lug 73, being slightly deflected upwardly toward its forward extremity as represented at 74 in Fig. 8.

In practice, the rails are applied to the plates 41 to cause the outer rail-flanges to extend under the undercut wall of the recess 55, and the abutments 53 caused to penetrate the tie 40 at their spur-portions 67 by any suitable means, as by running a construction-train over the track thus provided, the abutments 53 preferably having been applied to the plate before superposing the plate on the tie, and its shoulder 57 struck down to the position illustrated in Fig. 2, to hold the abutments against accidental displacement preparatory to securing the plate on the tie. The members 64ᵃ are then driven through the openings 46 in the plates to cause their lower tapered ends 67 to penetrate the tie, the members of each pair thereof being deflected away from each other by reason of the provision of the inclined surfaces 67, and into interlocking engagement at their shoulders 69 and 70 with the adjacent bars 48 and flanges 51, respectively, as represented of the one pair of members in Fig. 4, it being understood that the companion members 64ᵃ forming each clip 64 are made in what are known as lefts and rights, and that when positioned in the openings 46 the vertical recesses 66 oppose each other as illustrated in Fig. 4. The shoulders 71 of the clips 64, when the latter are positioned in the openings 46 as described, overlap the inner flanges of the adjacent rails as represented of the one in Fig. 2. A spike, of the common sledge-drive variety, such as that represented at 74ᵃ, is then inserted into the opposing recesses 66 in the members 64ᵃ and thereupon driven through the clip 64 and into the tie, the wedge-surfaces 75 of the spikes in this operation impinging against the inner edges of the lips 47, with the result of deflecting the spike forwardly and thereby forcing the members 64ᵃ toward the rail and into intimate engagement with the inner flange thereof, as clearly represented in Fig. 3, the members 64ᵃ in this operation riding at their shoulders 71 upon the rail-flange and tilting backwardly to a slight degree upon the surfaces 73, as represented in Fig. 3. It will thus be observed that the spikes 74 not only serve as means for holding the plate to the tie at one end, but also operate to secure the rail to the plate.

Figures 11, 12, 13, 14, 15, 16, 17, 18:
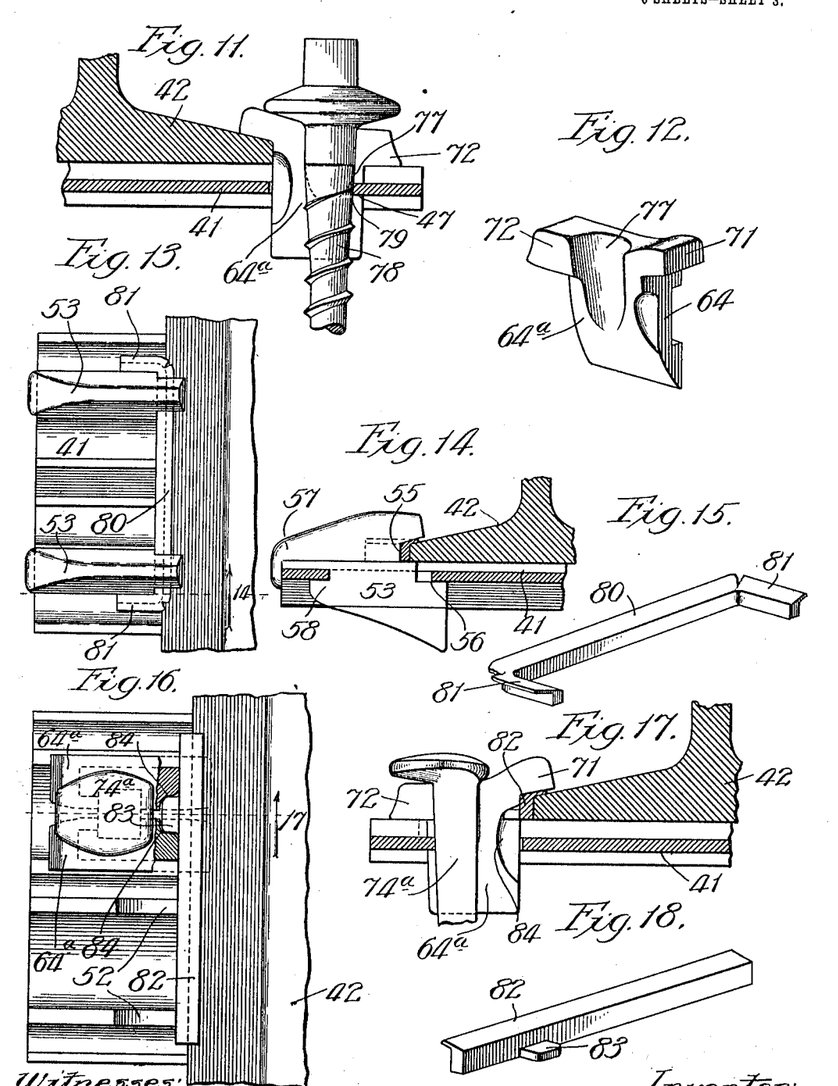
Fig. 11 is a broken section taken through a plate and a rail supported thereon, showing a form of clip for engaging with a flange of the rail suitable for use with a screw-spike.
Fig. 12 is a perspective view of one of the two similar members of the screw-spike-engaging clip of Fig. 11.
Fig. 13 is a plan view of the outer end of a plate provided with abutments equipped with a filler-bar for adjustment purposes, a rail being shown in engagement with the abutments.
Fig. 14 is a section taken at the line 14 on Fig. 13 and viewed in the direction of the arrow.
Fig. 15 is a perspective view of the filler-bar shown in Fig. 13.
Fig. 16 is a plan view of a plate, a rail resting thereon, and a spike-engaging rail-clip for the outer flange of the rail provided with a filler-bar for adjustment purposes, a portion of the upper end of the clip being broken away.
Fig. 17 is a section taken at the line 17 on Fig. 16 and viewed in the direction of the arrow.
Fig. 18 is a perspective view of the filler-bar employed in the construction illustrated in Fig. 16.
Figure 19:
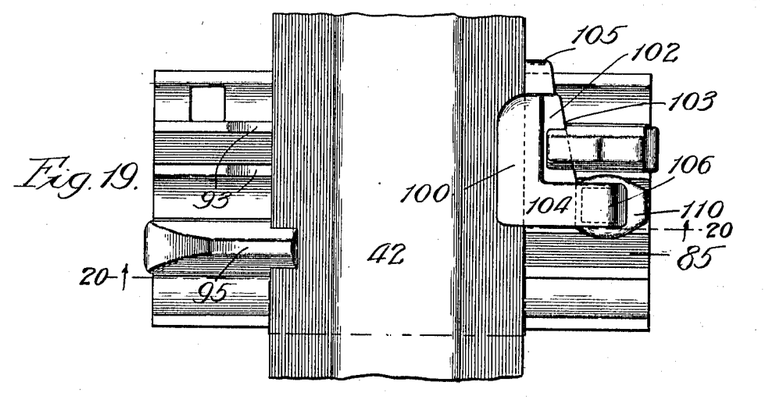
Fig. 19 is a plan view of a tie-plate with a rail supported thereon by means constituting another embodiment of my invention.

In order that the clips 64 may coöperate with spikes, as described, of slightly varying dimensions, I provide ribs 76 on the opposing side walls of the recesses 66 against which the sides of the spikes bear in being driven into the tie, these ribs being of such proportions as to cause them to become flattened out if the spikes are of unusual size, as is liable to be the case, as all spikes supposedly of the same size often vary slightly.

Where it is desired that a relatively thin tie-plate be employed, the provision of an abutment, like the abutment 53, is not always desirable, as the force necessary to cause it to become embedded in the tie is apt to bend and buckle the plate owing to the resistance offered by the tie to the penetration of the spur-portions of the clip. Under such conditions, if desired, the abutment 53 may be omitted and any other suitable form of abutment provided. Thus, instead of employing an abutment 53, the clip 64 of Figs. 1 to 9 inclusive may be substituted therefor, which would require the use of a plate like the one illustrated in Fig. 10 in which two of the openings 46 are provided at diagonally opposed corners of the plate for receiving clips 64, which would then engage the inner and outer flanges of the rail.

Where it is desired that the rail-engaging clip be employed in connection with a plate held to the tie by screw-spikes, the clip of the preceding figures may be employed, it being desirable, however, that such clip be modified to present curved recesses 77 as illustrated in Fig. 12, instead of the angular recesses 66. The screw-spike 78, which would be inserted through the plate between the companion members forming the clip 64, would operate to drive the members of the clip into the desired engagement with the rail-flange by the wedging action produced by the engagement of its upper wedge-shaped portion 79 with the lips 47, as illustrated in Fig. 11.

In Figs. 13–15, I have shown means for permitting the adjustment of the rail inwardly when used in connection with the construction illustrated in Figs. 1 to 9 inclusive, such adjustment being rendered necessary after the inner edge of the rail-tread has become worn away to a certain degree. These means comprise a bar 80 of angle-shape in cross-section, which extends into the recess 55 in the abutment 53 and against the faces of the fixed abutments 52, and is deflected outwardly at its ends as represented at 81 to fit against the sides of the abutments 52 and 53, as illustrated in Fig. 13 for preventing displacement of the bar 80.

Where a spike-engaging clip like that shown in Fig. 3 is employed to clamp the outer flange of the rail as explained of the modified construction of tie-plate illustrated in Fig. 10, the filler-bar for adjusting the rail inwardly may take the form of a flanged bar 82 which seats against the abutments 52 and under the shoulders 71, this bar being provided on its rear sides with a lug 83 which extends into opposing recesses 84 formed in the inner faces of the members 64ᵃ below the shoulders 71 as illustrated in Figs. 16 and 17, for preventing displacement of the bar 82.

It will be noted that by providing filler-bars as described, the rails may be adjusted on the tie-plates to the desired position without necessitating the relocation of the tie-plates on the tie.

Figure 20:
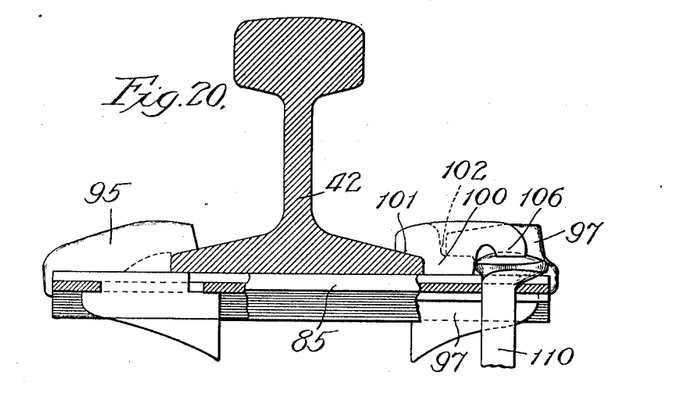
Fig. 20 is a section taken at the line 20 on Fig. 19 and viewed in the direction of the arrow.
Figure 21:
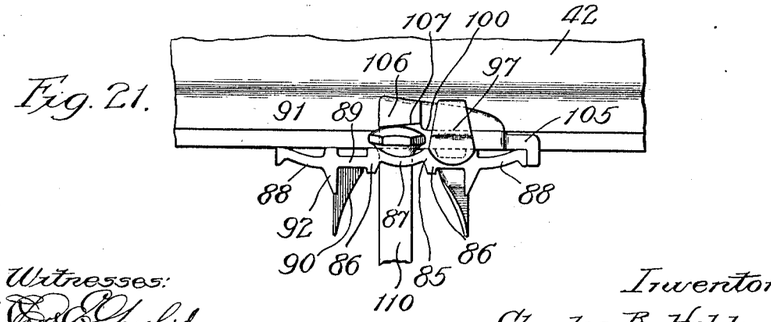
Fig. 21 is a view in elevation of the construction illustrated in Fig. 20, this view being taken from the right-hand side of Fig. 20 and toward the end of the plate and the side of the rail.
Figures 22, 23, 24, 25, 26, 27:
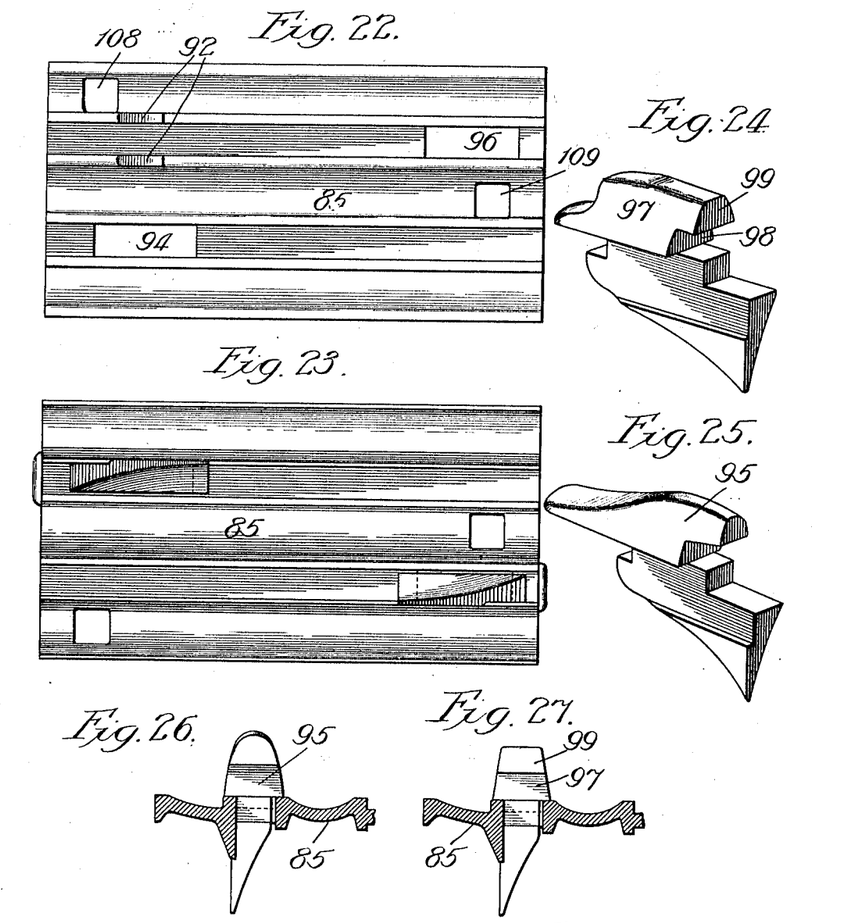
Fig. 22 is a top plan view of the plate of Fig. 19 with the abutments removed.
Fig. 23 is a bottom plan view of the same with the abutments in place.
Fig. 24 is a perspective view of the abutment located at the inner flange of the rail for engaging with the rail-engaging clip.
Fig. 25 is a perspective view of the rail-abutment at the opposite end of the plate.
Fig. 26 is a broken view in sectional elevation of the tie-plate and separable abutment coöperating with the rail.
Fig. 27, a similar view of the opposite end of the plate and removable abutment for the rail-clip.
Figure 28:
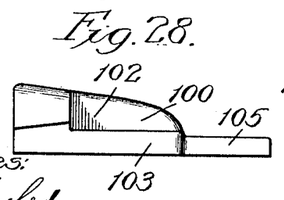
Fig. 28 is a view in elevation of the rail-engaging clip of Fig. 19.
Figure 29:
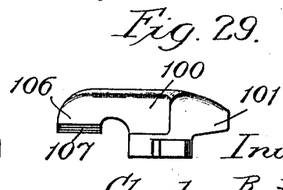
Fig. 29 is a view in end elevation of the clip of Fig. 28.
Figure 30:
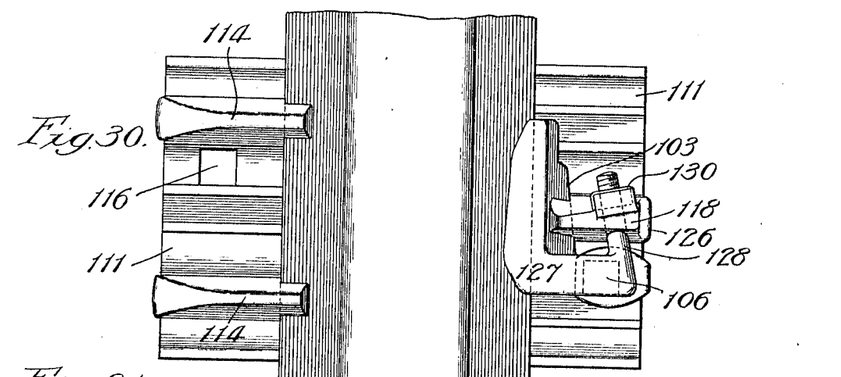
Fig. 30 is a view like that of Fig. 19 of still another embodiment of my invention.
Figure 31:
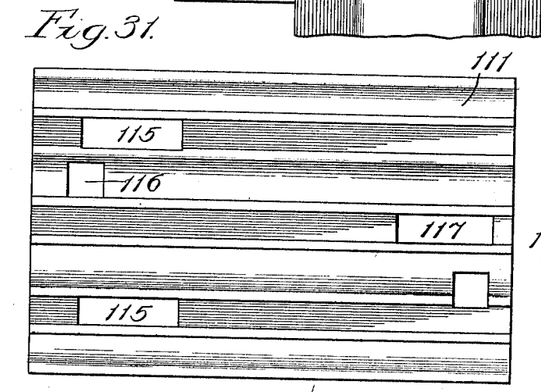
Fig. 31 is a top plan view of the plate of Fig. 30.

Referring to Figs. 19 to 29 inclusive, the plate therein shown and indicated at 85 is of the 2-bar type comprising a pair of longitudinally-extending bars 86 spaced apart and connected together by a relatively thin web 87 of concavo-convex shape, concaved on its upper side as illustrated in Fig. 21, and relatively thin sections 88 at the outer edges of the bars 86 which are also concaved on their upper surfaces, the bars 86 being longitudinally grooved on their upper and lower surfaces as represented at 89 and 90, respectively, for reducing the metal in the plate, and provided with flanges 91 and 92. The plate 85 carries fixed abutments 93 like the abutments 52 of the preceding figures and is apertured as indicated at 94 to receive an abutment 95 like the abutment 53 which interlocks with the adjacent flanges 91 and 92, the abutments 93 and 95 being located at the outer end of the plate for engaging with the outer flange of the rail. The opposite end of the plate 85 contains an elongated slot 96 for receiving a rail-clip-engaging abutment 97 which is of the same form as the abutment 95, its recessed portion 98 affording a shoulder 99 which is spaced from the rail when interlocked with the plate 85 as explained of the abutment 95 and as represented in Figs. 20 and 27. Coöperating with the inner flange of the rail and with the abutment 97 is a wedge-clip 100 which is formed on one side with a shouldered portion 101 which overlaps the adjacent flange of the rail, on its opposed side, which is recessed at 102, with a wedging surface 103, on its wider end with a thickened portion 104 for receiving a blow from a sledge for driving it into position, and at its narrower end with a lug 105, for a purpose hereinafter explained, the portion 104 of the clip being provided with a lug 106 having its outer surface tapered as indicated at 107. The manner of using this plate and fastening the rail thereto is as follows: The plate 85 with the abutments 95 and 97 fastened thereon as illustrated and described of the abutments 53 in Figs. 1 to 9 inclusive, is positioned on the tie and its abutments 95 and 97 embedded therein as described of the construction illustrated in the last referred to figures, whereupon spikes are driven into the tie through openings 108 and 109 in the plate 85. The rail is then seated on the plate to cause its outer flange to extend into engagement with the abutments 93 and 95, and the clip 100 thereupon inserted flatwise under the shoulder 99 of the abutment 97 to cause its shoulder 101 to engage with the inner rail-flange, and its wedge surface 103 with the last referred to abutment. The clip 100 is then driven into rigid engagement with the rail-flange by striking it with a sledge, the wedge-surface 103 in bearing against the inner wall of the recess 98 of the abutment 97 causing the clip to be forced toward the rail. In this operation, the lug 106 rides at its surface 107 upon the spike, illustrated at 110, driven through the opening 109, and produces a relatively slight tipping of the clip 100 toward the rail. After the clip is thus positioned, the lug 105 is struck down over the edge of the tie-plate 85 to hold it against displacement.

Figure 32:
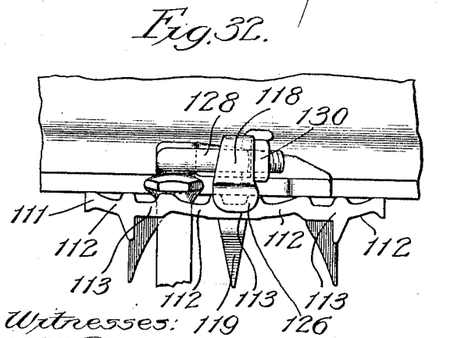
Fig. 32 is a view in end elevation of the structure shown in Fig. 30, this view being taken from the right-hand side of Fig. 30.
Figure 33:
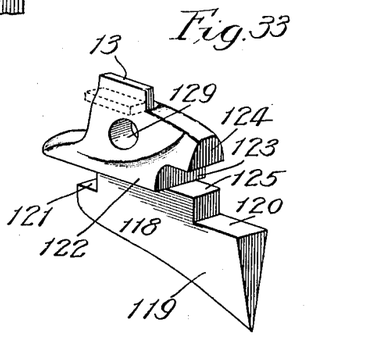
Fig. 33 is a perspective view of the clip-engaging abutment of Fig. 30.
Figure 34:
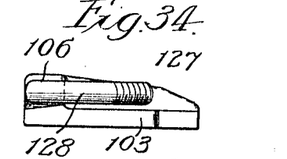
Fig. 34 is a view in side elevation of the same.
Figure 35:
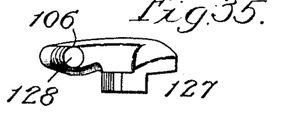
Fig. 35, a view in end elevation thereof.

Referring to the constructions illustrated in Figs. 30 to 35 inclusive, the plate represented at 111 is of the same general construction as that disclosed in Figs. 19 to 23 inclusive, the feature of providing upwardly-curved bar-connecting web-sections being embodied in this plate as indicated at 112. In this construction, however, three bars represented at 113 are employed instead of two, and the fixed abutments 93 are omitted and separable abutments 114 like the abutments 95 are substituted therefor, the abutments 114 extending through openings 115 in the plate 111 and interlocking with the plate as illustrated in Fig. 32 and as described of the construction illustrated in Figs. 19 to 27 inclusive. The spike-hole at the end of the plate carrying the abutments 114 is located between the latter as represented at 116 in Figs. 30 and 31. The opposite end of the plate contains an elongated opening 117 through the center of its middle bar-section 113 for receiving a clip-abutment 118. The abutment 118 is designed to protrude at its spur-equipped lower end 119 through the opening 117 and interlock with the under side of the plate 111 at shoulders 120 and 121, and with the upper side of the plate at a lateral shoulder 122 as described of the corresponding shoulders of the clip represented at Fig. 25. The end of the abutment 118 adjacent to the rail is formed with a recess 123 affording upper and lower shoulders 124 and 125, respectively, for a purpose hereinafter explained, and its opposite end, which protrudes beyond the end of the plate, is adapted to be bent down over the edge of the plate as illustrated at 126 for holding the abutment on the plate preparatory to its application to the tie. The rail-flange-engaging clip employed in this construction and represented at 127 is the same as the clip 100, excepting that the lug 105 is omitted and the lug 106 is provided with a bolt-member 128 which extends parallel with the wedge-surface 103 thereof, and projects at its free end through the opening 129 in the body of the abutment 118, at which protruding end it carries a nut 130 which screws against the face of the abutment 118 as represented in Fig. 32. The abutment 118 is provided with a lug 131 on its upper side which, in practice, will be bent over and against an edge of the nut 130 for locking it in position on the bolt 128, as represented in Fig. 32.

In practice, the plates would be applied to the tie and the depending portions of the abutments 114 and 118 embedded in the latter as described of the constructions illustrated in Figs. 19 to 29 inclusive. The clip 127 would thereupon be inserted laterally under the shoulders 125 of the abutment 118 and against the inner rail-flange, and the clip then driven into the desired rigid engagement with the rail as described of the constructions illustrated in Figs. 19 to 29 inclusive. The nut 130 would thereupon be screwed upon the bolt 128 as herebefore described, and the nut-locking lug 131 turned down to the position illustrated in Fig. 32.

It will be manifest that by providing the rail-adjusting members 80 and 82, all of the constructions disclosed are rendered capable of permitting the desired adjustment of the rail inwardly upon the plates, when by wear of its inner flange such adjustment becomes desirable, without disturbing the plates on the tie, which is of great advantage, as removal and re-location of the plates and their fastening means presents the objection of exposing to the weather the holes originally made in the tie by the application of the plates and their fastening means, thus subjecting the tie to rapid decay.

The provision of the concavo-convex bar-connecting web-sections with the concave portions thereof uppermost is of advantage in a tie-plate, as by such construction the plate is afforded transverse flexibility, which serves to reduce to the minimum rocking of the plate transversely on the tie when a train is passing over it, and consequently reduces wear of the tie and prevents withdrawal of the spikes therefrom.

What I claim as new, and desire to secure by Letters Patent, is—

1. The combination with an apertured tie-plate, of a spurred abutment located in the aperture of said plate and interlocking with said plate, with its spur-portion protruding beyond the under side of said plate.

2. The combination with an apertured tie-plate, of an abutment located in the aperture of said plate and interlocking with said plate, and having a spur extending below the tie-plate and under the same and with the point of said spur in a line within the outer line of a railway-rail when placed on said tie-plate and against said abutment.

3. The combination with an apertured tie-plate formed with a depending flange adjacent to and parallel laterally with the aperture of said plate, of an abutment located in said aperture and interlocking laterally with said flange.

4. The combination with an apertured tie-plate formed with a depending flange adjacent to the aperture, of an abutment located in said aperture and interlocking with said flange.

5. The combination with an apertured tie-plate, of an abutment located in the aperture of said plate, and having a spur-portion extending through said aperture and below said plate and formed with a laterally deflected face, said abutment interlocking laterally with said plate.

6. The combination with an apertured tie-plate, of an abutment located in said aperture and having a spur-portion formed with a deflected face, said abutment interlocking laterally with said plate.

7. The combination with an apertured tie-plate, of an abutment located in the aperture of said plate, and provided at one end with a recess for rail-engaging means and at the opposite end with shoulders one overlying and the other underlying the plate, for the purpose set forth.

8. The combination with an apertured tie-plate, of an abutment located in the aperture of said plate and provided at each of its opposite ends, longitudinally of said plate, with shoulders underlying and interlocking with said plate, and on one lateral side of said abutment with a shoulder underlying and laterally interlocking with the plate, upon rail engagement of said abutment with a rail on said plate.

9. The combination with an apertured tie-plate, of an abutment located in the aperture of said plate, and interlocking with said plate, said abutment carrying a lug bent into engagement with said plate and holding said abutment in position in said aperture.

10. The combination with an apertured tie-plate, of an abutment located in the aperture in said plate and provided with a deflected portion extending below the plate and containing a recess in the face thereof opposite to said deflected portion affording means at which said abutment interlocks with the plate.

11. The combination with an apertured tie-plate, of an abutment located in the aperture in said plate and provided with a deflected spur-portion extending below the plate, said abutment being provided with shoulders at its opposite ends extending beneath the plate, and with upper and lower shoulders at one side thereof at which the abutment interlocks with the plate.

12. The combination with an apertured tie-plate, of an abutment located in the aperture of said tie-plate and provided with a spur-portion extending below the under side of the plate, and with one side face of such spur deflected and the other side face of such spur provided with a shoulder extending under said plate, and with said abutment provided with shoulders at each of its opposite ends extending beneath said plate, and at one end with a recessed shoulder facing the greater length of said tie-plate and extending above said plate and adapted to afford rail-engaging means for fastening a rail to said plate, and at its other end provided with a lug extending over and beyond the edge of said plate and bent over the same, and with said spur extending below said plate deflected longitudinally of said plate also and the point thereof under and within the edge of the flange of a rail when such rail is placed in rail-fastening engagement with said abutment, and with said rail when so placed resting upon a stepped portion of said abutment, and interlocking said abutment with said plate.

13. The combination with an apertured tie-plate, of an abutment provided for rail-engaging means and located in said aperture, and provided with a spur-portion extending below said tie-plate and having stepped shoulders, the first of which extends under the railway-rail when fastened on said tie-plate, and the succeeding and adjacent stepped shoulder of which extends under and interlocks with said tie-plate, and with said spur deflected on its bottom longitudinally and its point of greatest depth within the outer line of and under said rail when so fastened.

14. The combination with an apertured tie-plate provided with means for engaging with a flange of a rail, a flange-engaging clip located in said aperture and provided with a spur-portion extending below the plate, and means for forcing said clip into engagement with the rail.

15. The combination with an apertured tie-plate provided with means for engaging with a flange of a rail, of a rail-flange-engaging clip located in said aperture and interlocking laterally with said plate and provided with a tie-penetrating spur-portion, and means for forcing said clip into engagement with the rail.

16. The combination with a tie and an apertured plate thereon provided with means for engaging with a flange of a rail, of a rail-flange-engaging clip located in said aperture and formed with a pair of members interlocking with said plate and between which the rail-securing means extend, for the purpose set forth.

17. The combination with a tie and an apertured plate thereon provided with means for engaging with a flange of a rail, of a rail-flange-engaging clip located in said aperture and formed with a pair of members laterally interlocking with said plate and between which the rail-securing means extend.

18. The combination with a tie and an apertured plate thereon provided with means for engaging with a flange of a rail, a rail-flange-engaging clip located in said aperture and formed of a pair of members interlocking with said plate, means for securing the plate to the tie located between said clip-members, and means on the plate engageable by said plate-securing means for forcing said clip-members into rail-flange-engaging position upon the act of applying said plate-securing means to the tie.

19. The combination of a tie and an apertured plate thereon provided with means for engaging with a flange of a rail, and with a lip extending into said aperture, a rail-flange-engaging clip located in said aperture and formed with an opening therethrough into which said lip extends, and means for securing the plate to the tie adapted to extend through the opening in the clip into engagement with the lip on the plate upon the act of applying said plate-securing means to the tie.

20. The combination of a tie and an apertured plate thereon provided with means for engaging with a flange of a rail, a rail-flange-engaging clip located in said aperture and formed of a pair of members interlocking with said plate, spikes for securing the plate to the tie, one of which is adapted to be driven between said clip-members, and means on the plate engageable by said spike for forcing said clip-members into rail-flange-engageing position.

21. The combination of a tie and an apertured plate thereon provided with means for engaging with a flange of a rail and a lip extending into said aperture, a rail-flange-engaging clip located in said aperture and formed of a pair of members laterally interlocking with said plate and containing opposed channels on their inner faces, spikes for securing the plate to the tie, one of which spikes extends through the channels in said clip-members and wedges against said lip, for the purpose set forth.

22. The combination of a tie and an apertured plate thereon provided with means for engaging with a flange of a rail, a rail-flange-engaging clip located in said aperture and formed of a pair of members one of which is provided on its inner face with a relatively thin rib of metal, spikes for securing the plate to the tie, one of which spikes extends between said clip-members and into engagement with said rib, and means on the plate engageable by said clip-engaging spike for forcing said clip-members into rail-flange-engaging position.

23. A tie-plate formed of longitudinally-extending ribs spaced apart and of greater depth than width, and relatively thin concavo-convex webs of less depth than width connecting said ribs together, and having their upper surfaces concaved, and with apertures in said thin webs to receive means for fastening a rail to said tie-plate, and with such apertures adjacent to such longitudinally-extending ribs.

24. A tie-plate formed of longitudinally-extending ribs spaced apart and of greater depth than width, and relatively thin concavo-convex webs of less depth than width connecting said ribs together with their concaved surfaces uppermost and having apertures therein adjacent to said ribs to receive rail-fastening means engaging and interlocking with such ribs, for the purpose set forth.

25. A tie-plate formed with longitudinally-extending ribs of greater depth than width and connected by webs of less depth than width having their upper surfaces concaved.

26. A tie-plate formed with longitudinally-extending ribs of greater depth than width and connected by webs of concavo-convex shape in cross-section and of less depth than width and having their concaved surfaces at the upper side of the plate.

CHARLES R. HOLDEN.

In presence of—
HARRY B. FASMER,
THOS. J. LAWLESS.

Copies of this patent may be obtained for five cents each, by addressing the "Commissioner of Patents, Washington, D. C."